United States Patent Office 2,844,603
Patented July 22, 1958

2,844,603

PROCESS FOR OXIDATION OF STEROIDS WITH PEROXYTRIFLUOROACETIC ACID

Edwin J. Strojny, Skokie, and Willard M. Hoehn, Wilmette, Ill., assignors to G. D. Searle & Co., Chicago, Ill., a corporation of Illinois No Drawing. Application July 5, 1955
Serial No. 520,124

1 Claim. (Cl. 260—397.5)

This invention relates to a method for the selective oxidation of steroids, and is particularly concerned with a process for oxidizing steroids, substituted in position 17 by an acetyl group, to the corresponding 17-acetoxy compound by treatment with peroxytrifluoroacetic acid. The essential feature of the process of this invention is the conversion by means of treatment with peroxytrifluoroacetic acid of a compound having the formula

R—COCH$_3$ into a compound having the formula

R—OCOCH$_3$ wherein R is a steroidal radical attached to the acetyl or acetoxy group at carbon atom number 17.

Such conversions have been effected with limited success by various peroxidic reagents in the prior art, as examples of which may be cited the oxidations of allopregnan-20-one, 3α-acetoxypregnan-20-one, 3β-acetoxy-5-pregnen-20-one, and 4-bromopregnane-3,20-dione by means of persulfuric acid, and the oxidations of 3β-acetoxyallopregnan-20-one, 3α-acetoxypregnane-11,20-dione, 3α,12α-diacetoxypregnan-20-one and 3α-acetoxypregnan-20-one by means of perbenzoic acid, as well as similar oxidations effected by reagents such as hydrogen peroxide and peracetic acid. However, while these processes have been useful as research tools, they have proved almost uniformly unsuitable for manufacturing operations on a commercial scale. The disadvantages of the peroxidic reagents of the prior art in their application to the oxidation of steroids containing a 17-acetyl side-chain include such factors as low yields (sometimes only a few percent of the desired product), long reaction time required, difficulties involved in isolating the desired product (often necessitating such purification procedures as fractionation with a Girard reagent and chromatography), the economic necessity of recovering and recycling unreacted starting material, and the potential hazards in preparing, storing and using certain of the reagents.

It has now been found that peroxytrifluoroacetic acid, a reagent known in the prior art to have unusual, and in certain specific applications highly selective and excellent oxidizing powers, is remarkably well suited for the conversion of 17-acetyl steroids into the corresponding 17-acetoxy steroids. In many instances, use of this oxidant permits the isolation of a virtually quantitative yield of the desired product after a brief reaction time, in marked contrast to the generally unsatisfactory processes of the prior art.

Steroids which are operative in and comprehended within the scope of the process of this invention include such compounds as 3β-acetoxyallopregnan-20-one, the 5,6-dibromide of 3β-acetoxy-5-pregnen-20-one, progesterone, the 5,6-dibromide of 3β-acetoxy-16,17-epoxy-5-pregnen-20-one, 19-norprogesterone, 3α-acetoxypregnane-11,20-dione, 11α-acetoxy-4-pregnene-3,20-dione, diacetoxy substitution products of pregnan-20-one, and stereoisomers of the foregoing. While the high degree of selectivity of the peroxytrifluoroacetic acid reagent often permits the desired reaction at position 17 even in the presence of sensitive groups elsewhere in the molecule, the highest yields are obtained when such sensitive groups, illustratively non-conjugated ketones and non-conjugated olefinic linkages, are protected.

Excellent yields are obtained by conducting these oxidation reactions in any of a variety of reaction solvents, such as trifluoroacetic acid, aromatic hydrocarbons, or chlorinated aliphatic hydrocarbon solvents. For reasons of economy, generally-satisfactory solubilizing properties and the simplified isolation of product it permits, chloroform is one of the preferred reaction solvents in this process.

In carrying out this process it is usually preferred to contact a solution of the steroid with an approximately equivalent amount of peroxytrifluoroacetic acid, and allow the reaction mixture to stand at from —10 to 50° C. for from 5 minutes to 24 hours. However, in the absence of a substantial excess of oxidant, satisfactory results are obtained by carrying out the reaction either at a higher temperature or for a longer period of time. In calculating the amount of peroxytrifluoroacetic acid required to oxidize a given weight of steroid, the oxidizing capacity of the peroxytrifluoroacetic acid reagent is measured by titrating with standardized thiosulfate solution, the iodine liberated from an acidified potassium iodide solution by a measured amount of the peroxytrifluoroacetic acid reagent. Calculations of the amount of peroxytrifluoroacetic acid in the peroxytrifluoroacetic acid reagent are based on the equivalencies expressed in the following equations:

$$2H^+ + CF_3CO_3H + 2I^- \rightarrow I_2 + CF_3CO_2H + H_2O$$

$$I_2 + 2S_2O_3^= \rightarrow 2I^- + S_4O_6^=$$

It is preferred to use approximately the stoichiometric amount of oxidant required to oxidize the steroid in this process, based on the requirement of one molecule of peroxytrifluoroacetic acid for each molecule of steroid to be oxidized. Satisfactory results are also obtained using a moderate excess of oxidant.

The 17-acetoxy compound which is the product of the oxidation reaction can be readily isolated from the mixture if desired. However, since in many cases the 17-acetoxy derivative is desired as an intermediate in the manufacture of a more valuable compound, it is often preferred not to isolate it in a pure form but rather to subject the crude product to a further chemical operation or sequence of chemical operations prior to the isolation of a purified product. The fact that 17-acetoxy steroids are obtained in almost quantitative yields and in an excellent state of purity by the process of this invention permits such further operations to be conducted efficiently.

This invention will appear more fully from the examples which follow. These examples are set forth by way of illustration only and it will be understood that the invention is not to be construed as limited in spirit or in scope by the details contained therein. It will be apparent to those skilled in the art that many modifications in materials and methods can be made without departing from the scope of this invention. In these examples, temperatures are given in degrees centigrade (° C.) and quantities of materials are given as parts by weight, except where otherwise indicated.

*Example 1*

An oxidizing reagent containing peroxytrifluoroacetic acid is prepared by the gradual addition of 1.39 parts of 90% hydrogen peroxide to 10 parts of trifluoroacetic anhydride. The temperature of the mixture is maintained at about 5–10° C. during the period of addition. The oxidizing capacity of the solution is determined by the standard procedure of titrating with standardized thiosulfate solution the iodine liberated by the addition of a measured amount of the peroxytrifluoroacetic acid solution to an excess of acidified potassium iodide solution. A solution of 2 parts of 3β-acetoxyallopregnan-20-one in 7.5 parts of trifluoroacetic acid is cooled to about 0–10° C. and treated by the addition of a quantity of the peroxytrifluoroacetic acid solution equivalent to 2.2 parts of anhydrous sodium thiosulfate, as measured by titration against liberated iodine. The reaction mixture is maintained at about 10° C. for 30 minutes. It is then diluted with about 50 parts of benzene, and washed with water, with sodium bicarbonate solution and finally with several portions of water. The organic phase is dried over calcium sulfate, filtered, and concentrated under reduced pressure to yield a crystalline residue of androstane-3β,17β-diol diacetate.

*Example 2*

An oxidizing reagent containing peroxytrifluoroacetic acid is prepared by the gradual addition of 2.78 parts of 90% hydrogen peroxide to 22.4 parts of trifluoroacetic anhydride maintained at about 0–10° C. About 1 hour is a convenient period of time for the addition. The peroxytrifluoroacetic acid reagent is then cooled to about —5° C. and added in small portions to a cold solution of 5 parts of 3β-acetoxyallopregnan-20-one in 38 parts of trifluoroacetic acid, at such a rate that the temperature of the reaction mixture does not go above 2° C. The reaction mixture is then maintained at about —5 to —8° C. for 5 hours. It is partitioned between 175 parts of benzene and 200 parts of water. The aqueous phase is extracted with an additional portion of benzene, and the combined benzene extracts are washed with sodium carbonate solution and concentrated to dryness under reduced pressure. The residue is saponified by heating it under reflux for 2 hours with an excess of sodium hydroxide in aqueous methanol solution. The saponification mixture is concentrated by distillation until most of the methanol is removed, and the residual suspension is cooled and filtered. There is thus obtained androstane-3β,17β-diol melting at about 162–165° C. The overall yield from 3β-acetoxyallopregnan-20-one is 95% of the theoretical amount.

*Example 3*

An oxidizing reagent containing peroxytrifluoroacetic acid is prepared by the method of Example 2 from 2.78 parts of 90% hydrogen peroxide and 22.4 parts of trifluoroacetic anhydride and is added gradually, with efficient external cooling, to a solution of 5 parts of 3β-acetoxyallopregnan-20-one in 37 parts of chloroform. The temperature of the reaction mixture is maintained at about 0° C. during the period of addition and is refrigerated at this temperature for approximately an additional 20 hours. The reaction mixture is then washed with water and with sodium carbonate solution and is concentrated to dryness under reduced pressure. The residue is saponified by heating it under reflux for 2 hours with a solution of sodium hydroxide in aqueous methanol, after which most of the methanol is removed by distillation. The remaining suspension is diluted with water, chilled, and filtered. There is thus obtained androstane-3β,17β-diol melting at 165–166.4° C. The overall yield from 3β-acetoxyallopregnan-20-one is 93% of the theoretical amount.

*Example 4*

A solution of 7.21 parts of 3β-acetoxyallopregnan-20-one in 37 parts of chloroform is cooled to 12° C. and treated by the gradual addition of a quantity of peroxytrifluoroacetic acid reagent equivalent to 2.66 parts of peroxytrifluoroacetic acid, as determined by the titration of liberated iodine with standardized thiosulfate solution. The peroxytrifluoroacetic acid is added over a period of about 10 minutes, during which time the temperature of the reaction mixture rises to about 25° C. After standing for an additional hour at room temperature, the reaction mixture is treated with a small amount of aqueous sodium thiosulfate solution to destroy any excess oxidant, and the chloroform is removed by distillation. The residue is saponified by heating it under reflux for 2 hours with a solution of sodium hydroxide in aqueous methanol. The methanol is removed by distillation, and the remaining suspension is diluted with 200 parts of water, chilled and filtered. In this manner there is obtained in practically quantitative yield, androstane-3β,17β-diol melting at 163.5–165.5° C.

*Example 5*

A quantity of peroxytrifluoroacetic acid reagent equivalent to 2.06 parts of peroxytrifluoroacetic acid, as determined by the titration of liberated iodine with standardized thiosulfate solution, is added in small portions over a period of 15 minutes to a solution of 8.0 parts of the dibromide of 3β-acetoxy-5-pregnen-20-one (prepared by the addition of one molecular equivalent of bromine to 3β-acetoxy-5-pregnen-20-one) in 69.5 parts of chloroform. By means of external cooling, the temperature of the reaction mixture is maintained at about 10–20° C. during the period of addition. It is allowed to stand at room temperature for an additional 45 minutes, and is then treated with a small amount of aqueous sodium thiosulfate solution to destroy any excess oxidant. The chloroform is removed by distillation, leaving a residue of the 5,6-dibromide of androstene-3β,17β-diol diacetate. By standard procedures this dibromide is converted into hormonally-active compounds. For example, debromination with sodium iodide in refluxing butanone followed by saponification with sodium hydroxide in aqueous methanol affords 5 - androstene - 3β,17β - diol. 5-androstene-3β,17β-diol can be converted to 4-androstene-3,17-dione and to testosterone by methods well known in the prior art.

*Example 6*

A solution of 3.14 parts of progesterone in 22.5 parts of chloroform is cooled to 10° C. and treated by the gradual addition of a quantity of peroxytrifluoroacetic acid reagent equivalent to 1.3 parts of peroxytrifluoroacetic acid, as determined by the titration of liberated iodine with standardized thiosulfate solution. By means of external cooling, the temperature of the reaction mixture is not allowed to exceed about 30° C. during the period of addition, which requires about 15 minutes. The reaction mixture is allowed to stand for an additional 45 minutes at room temperature, and it is then treated with a small amount of aqueous sodium thiosulfate solution to react with any excess peroxytrifluoroacetic acid. The chloroform is removed by distillation, leaving a residue of crude testosterone acetate. The residue is saponified by allowing it to stand at room temperature for 2 hours in a solution of sodium hydroxide in aqueous methanol. The saponification mixture is concentrated by distillation under reduced pressure until almost all of the methanol is removed, and the remaining suspension is diluted with water, chilled and filtered. Recrystallization from aqueous acetone affords purified testosterone melting at about 155° C.

What is claimed is:

A process for the preparation of 3β,17β-diacetoxyandrostane which comprises treating 3β-acetoxyallopregnan-20-one with a substantially stoichiometric amount of peroxytrifluoroacetic acid at a temperature between −15° C. and +50° C.

References Cited in the file of this patent

UNITED STATES PATENTS 2,304,836    Marker _____ Dec. 15, 1942
2,598,648    Miescher _____ May 27, 1952

OTHER REFERENCES

Emmons: JACS, pp. 4623–24, vol. 75, September 20, 1953. (Copy in Pat. Off. Lib.)

J. Am. Chem. Soc., vol. 69, pp. 2899–2901, 1947, L. H. Sarrett.